US012618741B2

(12) United States Patent
Ishii et al.

(10) Patent No.: US 12,618,741 B2
(45) Date of Patent: May 5, 2026

(54) CHAMBER, LID, AND LEAK TESTER

(71) Applicant: YAMAHA FINE TECHNOLOGIES CO., LTD., Hamamatsu (JP)

(72) Inventors: Toru Ishii, Hamamatsu (JP); Minoru Yamamoto, Fukuroi (JP); Daisuke Homma, Hamamatsu (JP); Kosei Fujita, Hamamatsu (JP)

(73) Assignee: YAMAHA FINE TECHNOLOGIES CO., LTD., Hamamatsu (JP)

( * ) Notice: Subject to any disclaimer, the term of this patent is extended or adjusted under 35 U.S.C. 154(b) by 352 days.

(21) Appl. No.: 18/366,795

(22) Filed: Aug. 8, 2023

(65) Prior Publication Data

US 2024/0053218 A1     Feb. 15, 2024

(30) Foreign Application Priority Data

Aug. 9, 2022     (JP) .................................. 2022-127228

(51) Int. Cl.
G01M 3/22          (2006.01)

(52) U.S. Cl.
CPC .................................. G01M 3/229 (2013.01)

(58) Field of Classification Search
CPC .......... G01M 3/26; G01M 3/225; G01M 3/20; G01M 3/223; G01M 3/363; G01M 11/0214; G01M 3/229; G01M 3/3209; G01M 3/3281
USPC ...................................................... 73/40.7, 40
See application file for complete search history.

(56) References Cited

FOREIGN PATENT DOCUMENTS

JP          2013134098  A  *  7/2013

* cited by examiner

*Primary Examiner* — John E Breene
*Assistant Examiner* — Truong D Phan
(74) *Attorney, Agent, or Firm* — ROSSI, KIMMS & McDOWELL LLP

(57)          ABSTRACT

An object of the present invention is to provide a chamber in which workpieces of different sizes can be positioned. A chamber according to an aspect of the present invention is a chamber for a leak tester, the chamber housing in the interior thereof a workpiece having an opening, the chamber including: a first member having a recess that forms a housing space for the workpiece; a second member adapted to close an open end of the recess; and a positioning mechanism for positioning the workpiece within the housing space such that the opening is in a predetermined position, wherein the positioning mechanism holds the workpiece apart from the first member and the second member.

14 Claims, 14 Drawing Sheets

70

71

CHAMBER, LID, AND LEAK TESTER

BACKGROUND OF THE INVENTION

1. Field of the Invention

The present invention relates to a chamber, a lid, and a leak tester.

2. Description of the Related Art

A leak tester is used to inspect a workpiece having an opening for gas leaks and the like. In a known leak tester of this type, the workpiece is positioned in a chamber such that the opening is in a predetermined position, whereupon a nozzle is attached to the opening of the workpiece and a tracer gas is supplied to the space inside the workpiece through the nozzle (see Japanese Unexamined Patent Application Publication No. 2013-134098).

SUMMARY OF THE INVENTION

Japanese Unexamined Patent Application Publication No. 2013-134098 describes a chamber in which a housing space for housing the workpiece is formed by joining first and second chamber constituent bodies to each other. Japanese Unexamined Patent Application Publication No. 2013-134098 indicates that the housing space is formed in a shape corresponding to the workpiece, and the workpiece is positioned within the chamber by partially supporting the workpiece using the inner surface of the first chamber constituent body forming the housing space.

The chamber described in Japanese Unexamined Patent Application Publication No. 2013-134098 is designed to correspond to the size of the workpiece. Therefore, according to the configuration described in Japanese Unexamined Patent Application Publication No. 2013-134098, a different chamber must be prepared every time the size of the workpiece changes. Accordingly, the chamber described in Japanese Unexamined Patent Application Publication No. 2013-134098 lacks versatility.

The present invention has been designed on the basis of the circumstances described above, and an object thereof is to provide a chamber in which workpieces of different sizes can be positioned.

(1) A chamber according to an aspect of the present invention is a chamber for a leak tester, the chamber housing in the interior thereof a workpiece having an opening, the chamber including: a first member having a recess that forms a housing space for the workpiece; a second member adapted to close an open end of the recess; and a positioning mechanism for positioning the workpiece within the housing space such that the opening is in a predetermined position, wherein the positioning mechanism holds the workpiece apart from the first member and the second member.

(2) In (1), preferably, the positioning mechanism includes a spacer plate and a pushing body respectively disposed on the second member, the spacer plate is interposed between the workpiece and an inner surface of the recess, the pushing body is disposed so as to face the spacer plate with the workpiece therebetween, and the pushing body is adapted to push the workpiece toward the spacer plate.

(3) In (2), the pushing body preferably pushes the spacer plate via the workpiece such that the spacer plate is appressed to the inner surface of the recess.

(4) In (2) or (3), preferably, the positioning mechanism includes a connecting portion for connecting the spacer plate to the second member, and the spacer plate is held by the connecting portion in a cantilevered manner.

(5) In (4), the connecting portion preferably includes a swinging mechanism adapted to swing the spacer plate, and a fixing mechanism adapted to maintain an interval between the spacer plate and the workpiece.

(6) In any of (2) to (5), the second member is preferably adapted to close the open end of the recess in a state where the workpiece is disposed between the spacer plate and the pushing body.

(7) In (4) or (5) or in (6) citing (4) or (5), preferably, the connecting portion holds the spacer plate and the pushing body such that the spacer plate and the pushing body do not contact the workpiece before the second member closes the open end of the recess, and holds the spacer plate and the pushing body in contact with the workpiece once the second member has closed the open end of the recess.

(8) In (5), the fixing mechanism preferably includes an elastic body for pushing the spacer plate in a direction heading away from the second member.

(9) In any of (1) to (8), the positioning mechanism preferably includes: a first moving body that projects into the housing space and supports the workpiece in a predetermined position in a projection direction of the first moving body; and a second moving body that projects into the housing space such that the second moving body faces the first moving body, and pushes the workpiece toward the first moving body.

(10) In (9), the first moving body and the second moving body preferably penetrate the first member.

(11) In (9) or (10), the first moving body preferably includes a rod that is caused to extend and retract by a numerical value control actuator.

(12) In any of (1) to (11), preferably, the chamber further includes a nozzle, and the positioning mechanism positions the workpiece in a position where the nozzle can be attached to the opening.

(13) A lid according to another aspect of the present invention is a lid for use on a chamber for a leak tester, the chamber housing a workpiece having an opening, the lid including: a lid body that is adapted to close an entrance or exit through which the workpiece is inserted into or removed from the chamber; a spacer plate disposed on an inner surface side of the lid body such that an interval is formed between the spacer plate and the lid body; and a pushing body disposed on the inner surface of the lid body such that the workpiece can be sandwiched between the pushing body and the spacer plate.

(14) A leak tester according to a further aspect of the present invention includes a chamber housing in the interior thereof a workpiece having an opening, the chamber including: a first member having a recess that forms a housing space for the workpiece; a second member adapted to close an open end of the recess; and a positioning mechanism for positioning the workpiece within the housing space such that the opening is in a predetermined position, wherein the positioning mechanism holds the workpiece apart from the first member and the second member.

In the chamber according to an aspect of the present invention, the positioning mechanism is capable of positioning the workpiece apart from the first member and the second member, and therefore the housing space does not have to correspond to the size of the workpiece. As a result, workpieces of different sizes can be positioned within the housing space of the chamber.

DESCRIPTION OF THE PREFERRED EMBODIMENTS

Embodiments of the present invention will be described in detail below with appropriate reference to the figures. Note that the figures are schematic and may not correspond to actual dimensions, ratios, and so on.

First Embodiment

Chamber

Figure 1:
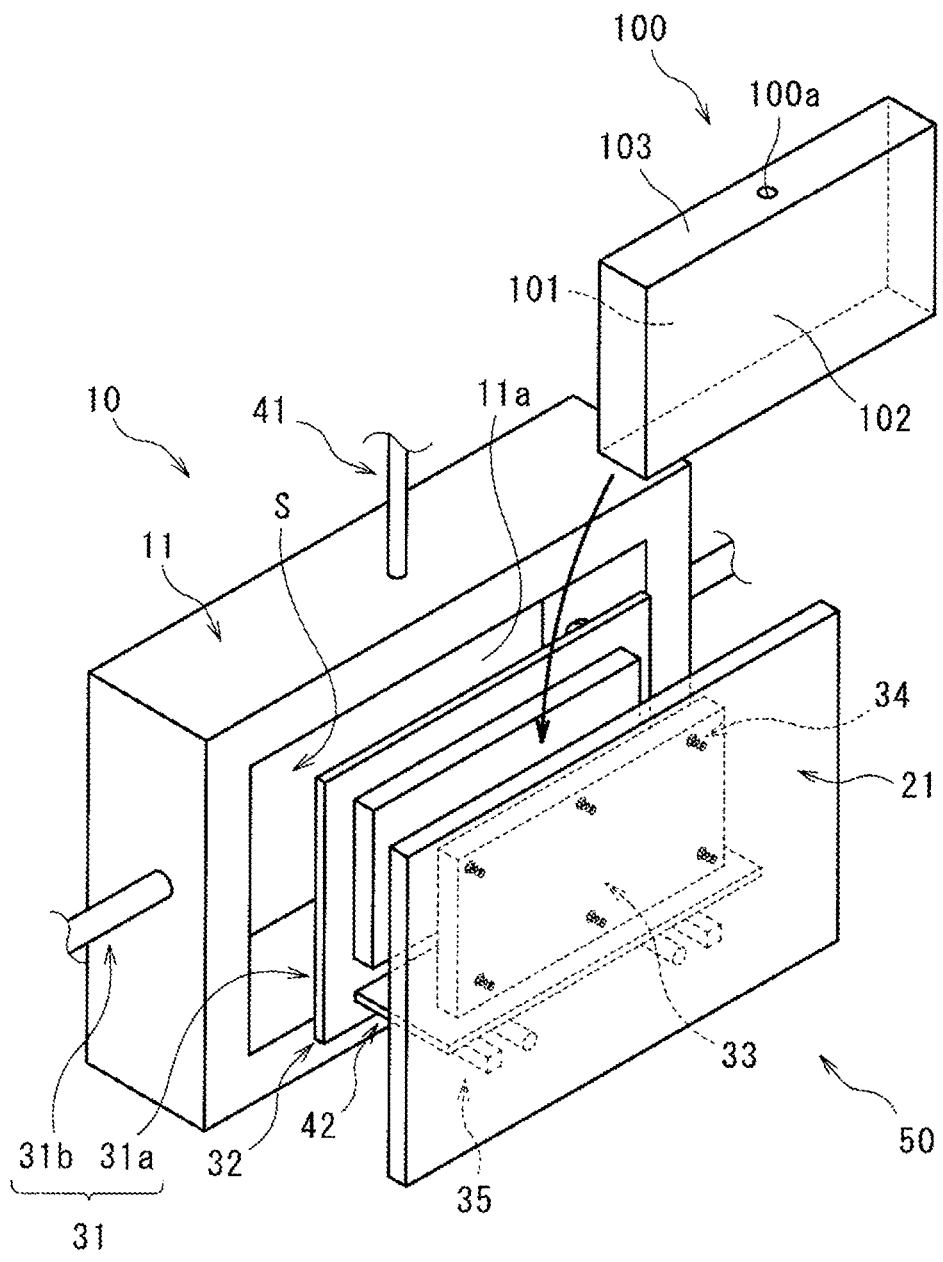
FIG. 1 is a schematic perspective view showing a chamber according to an embodiment of the present invention.

A chamber 10 of FIG. 1 is a chamber used in a leak tester. The chamber 10 houses in the interior thereof a workpiece 100 having an opening 100*a*. The workpiece 100 is a hollow body, for example. There are no particular limitations on the shape of the workpiece 100, but for example, the workpiece 100 may be formed in a shape having two parallel surfaces (a first surface 101 and a second surface 102), with the opening 100*a* provided in a surface (a third surface 103) that connects the first surface 101 to the second surface 102. The chamber 10 is provided to allow the workpiece 100 to be inspected for leakage of a fluid such as a tracer gas sealed inside the workpiece 100.

The chamber 10 includes a first member 11 having a recess 11*a* that forms a housing space S for the workpiece 100, a second member 21 capable of closing an open end of the recess 11*a*, and a positioning mechanism 31 for positioning the workpiece 100 within the housing space S so that the opening 100*a* is in a predetermined position. By closing the open end of the recess 11*a* using the second member 21, the housing space S is configured as a hermetically sealed space.

The chamber 10 also includes a nozzle 41. The nozzle 41 projects into the housing space S through the first member 11. The nozzle 41 projects in a direction perpendicular to a depth direction of the recess 11*a*. In other words, the nozzle 41 projects in a direction parallel to the outer surface of the first member 11 on which the recess 11*a* is open (more specifically, an end surface on an open side of a peripheral wall portion 12, to be described below). The nozzle 41 is configured to be capable of advancing and retreating in an axial direction. The fluid is sealed inside the workpiece 100 by attaching the nozzle 41 to the opening 100*a* within the housing space S.

The positioning mechanism 31 holds the workpiece 100 apart from the first member 11 and the second member 21. The positioning mechanism 31 includes a first positioning mechanism 31*a* for positioning the workpiece 100 in the depth direction of the recess 11*a*, and a second positioning mechanism 31*b* for positioning the workpiece 100 in a direction other than the depth direction of the recess 11*a*.

The positioning mechanism 31 positions the workpiece 100 in a position where the nozzle 41 can be attached to the opening 100*a*. In other words, in the chamber 10, the workpiece 100 is positioned within the housing space S by the positioning mechanism 31 in alignment with the position of the nozzle 41 while keeping the placement of the nozzle 41 constant. According to this configuration, workpieces 100 of different sizes can easily be positioned in desired positions within the housing space S. As a result, leak tests can easily be performed on workpieces 100 of different sizes.

In the chamber 10, the positioning mechanism 31 is capable of positioning the workpiece 100 apart from the first member 11 and the second member 21, and therefore the housing space S does not have to correspond to the size of the workpiece 100. Accordingly, in the chamber 10, workpieces 100 of different sizes can be positioned within the housing space S.

The respective constituent members of the chamber 10 will be described in detail below.

First Member

Figure 2:
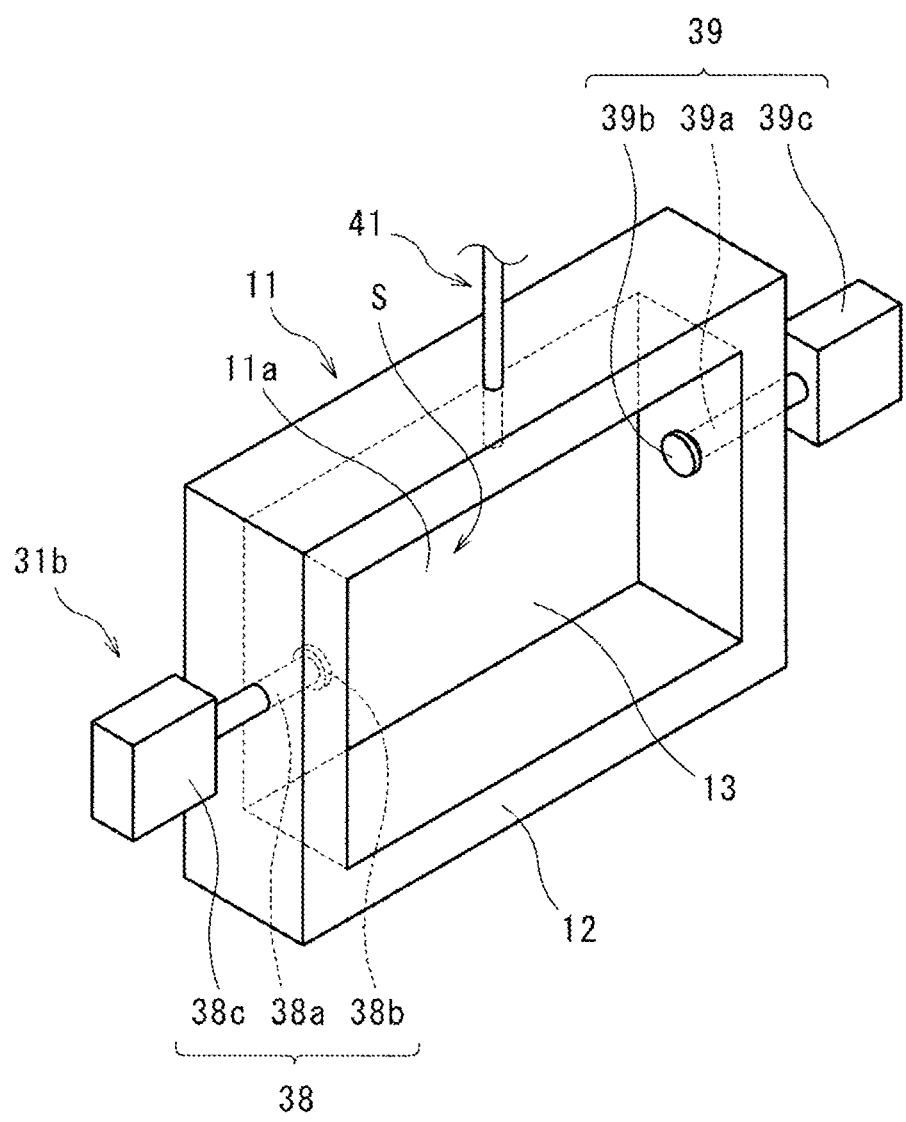
FIG. 2 is a schematic perspective view showing a state in which a second member has been removed from the chamber of FIG. 1.

As shown in FIG. 2, the first member 11 includes the tubular peripheral wall portion 12 and a bottom wall portion 13 that closes an opening at one end of the peripheral wall portion 12. The peripheral wall portion 12 has a rectangular tube shape, for example. The recess 11*a* is defined by the inner surface of the peripheral wall portion 12 and the inner surface of the bottom wall portion 13. The recess 11*a* has a rectangular parallelepiped shape, for example.

Second Member

The second member 21 is configured to be capable of closing the open end of the recess 11*a*, as described above. In other words, the second member 21 is a lid body capable of closing an entrance/exit through which the workpiece 100 is inserted into/removed from the chamber 10. The second member 21 is plate-shaped. The second member 21 is configured so that a peripheral edge part of the inner surface thereof can be appressed to the open-side end surface of the peripheral wall portion 12. The inner surface of the second member 21 defines the housing space S for the workpiece 100 together with the inner surface of the recess 11*a*. Note that the "inner surface" of the second member refers to the surface on the side that faces the housing space S in a state where the open end of the recess is closed.

A sealing member for maintaining air-tightness may be disposed on the appressed parts of the first member 11 and the second member 21. For example, the sealing member may be attached in advance to one or both of the open-side end surface of the peripheral wall portion 12 of the first member 11 and the peripheral edge part of the inner surface of the second member 21. An O-ring, for example, may be used as the sealing member.

First Positioning Mechanism

Figure 3:
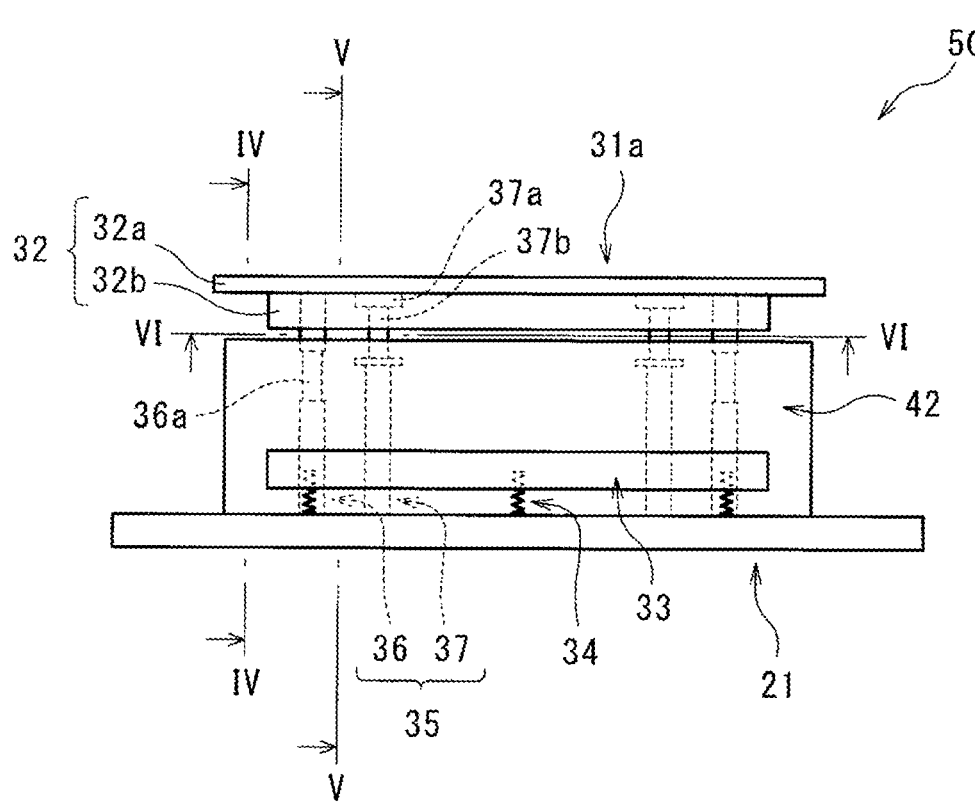
FIG. 3 is a schematic plan view showing the second member of the chamber of FIG. 1 and a positioning mechanism disposed on the second member.
Figure 4:
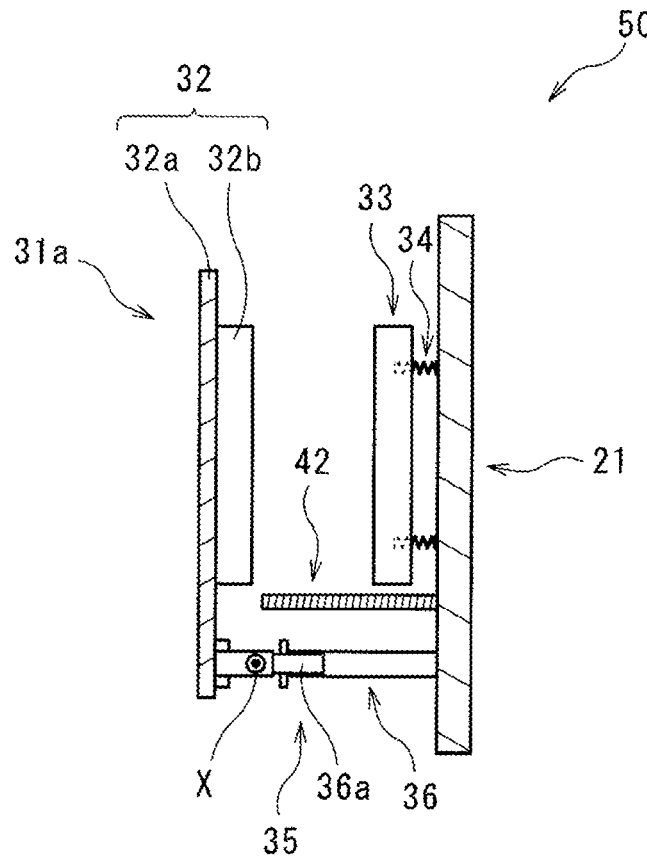
FIG. 4 is a sectional view of the second member and the positioning mechanism of FIG. 3, taken along an IV-IV line.
Figure 5:
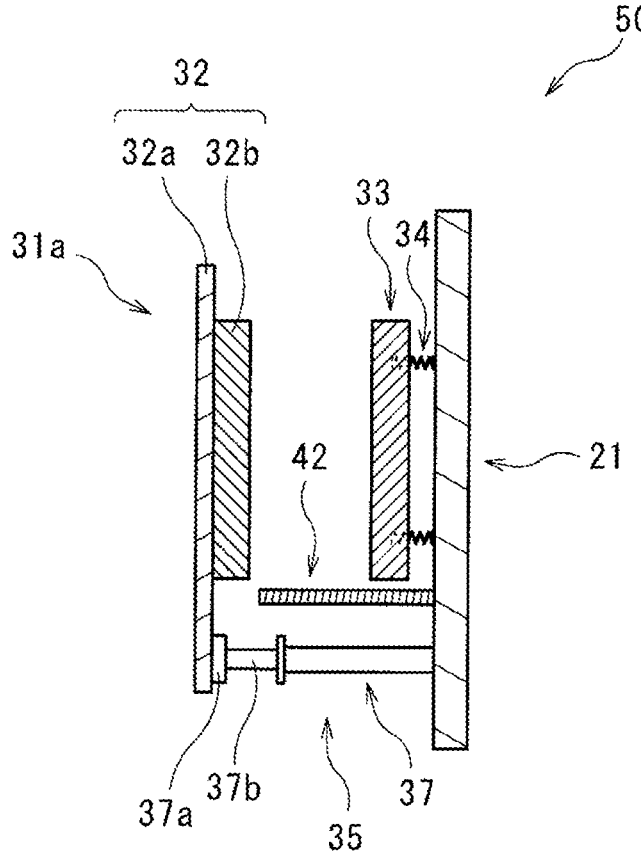
FIG. 5 is a sectional view of the second member and the positioning mechanism of FIG. 3, taken along a V-V line.

As shown in FIGS. 3 to 5, the first positioning mechanism 31a includes a spacer plate 32 and a pushing body 33, which are respectively disposed on the second member 21. The first positioning mechanism 31a also includes a connecting portion 35 for connecting the spacer plate 32 to the second member 21. In this embodiment, the spacer plate 32 and the pushing body 33 face each other in a horizontal direction.

The first positioning mechanism 31a is housed in the housing space S together with the workpiece 100 in a state where the workpiece 100 is disposed between the spacer plate 32 and the pushing body 33. In other words, the second member 21 is configured to be capable of closing the open end of the recess 11a in a state where the workpiece 100 is disposed between the spacer plate 32 and the pushing body 33. According to this configuration, the workpiece 100 can easily be inserted into and removed from the housing space S of the chamber 10, and the workpiece 100 can be positioned within the housing space S easily and reliably.

Spacer Plate

As shown in FIGS. 7 to 10, the spacer plate 32 is interposed between the workpiece 100 and the inner surface of the recess 11a, or more specifically between the first surface 101 of the workpiece 100 and the bottom surface of the recess 11a. The plate thickness of the spacer plate 32 is adjusted so that the positions of the opening 100a of the workpiece 100 and the nozzle 41 are aligned in the depth direction of the recess 11a. A flow passage through which the fluid that leaks out from the workpiece 100 can pass may be formed in the spacer plate 32. There are no particular limitations on the flow passage, but a groove formed in the surface that faces the workpiece 100, for example, may be used. Alternatively, the flow passage may be formed by providing a ventilation portion formed from a porous material or the like in the spacer plate 32.

The spacer plate 32 has a rectangular shape when seen from the plate thickness direction, for example. The spacer plate 32 includes a body 32a disposed on the side facing the bottom surface of the recess 11a, and an auxiliary portion 32b that is laminated onto the body 32a so as to face the workpiece 100. The auxiliary portion 32b maintains the position of the workpiece 100 while absorbing deformation of the workpiece 100 when the workpiece 100 is caused to expand by the fluid sealed therein or the like.

Pushing Body

The pushing body 33 is disposed so as to face the spacer plate 32 with the workpiece 100 therebetween. In other words, the pushing body 33 is interposed between the second surface 102 of the workpiece 100 and the inner surface of the second member 21. The pushing body 33 is plate-shaped, for example. The pushing body 33 is provided so as to be capable of pushing the workpiece 100 toward the spacer plate 32 side. The pushing body 33 is supported from the second member 21 side by a spring member 34 such as a coil spring. In a state where the workpiece 100 is housed in the housing space S, the spring member 34 brings the second surface 102 of the workpiece 100 into contact with the pushing body 33 and pushes the spacer plate 32 toward the bottom surface side of the recess 11a via the workpiece 100. A flow passage through which the fluid that leaks out from the workpiece 100 can pass may be formed in the pushing body 33. There are no particular limitations on the flow passage, but for example, a groove, a ventilation portion, or the like similar to that of the spacer plate 32 may be used.

The first positioning mechanism 31a includes the spacer plate 32 that is interposed between the workpiece 100 and the bottom surface of the recess 11a, and the pushing body 33 that faces the spacer plate 32 with the workpiece 100 therebetween, and the pushing body 33 is capable of pushing the workpiece 100 toward the spacer plate 32 side. Thus, the first positioning mechanism 31a can easily hold the workpiece 100 apart from the first member 11 and the second member 21.

Figure 11:
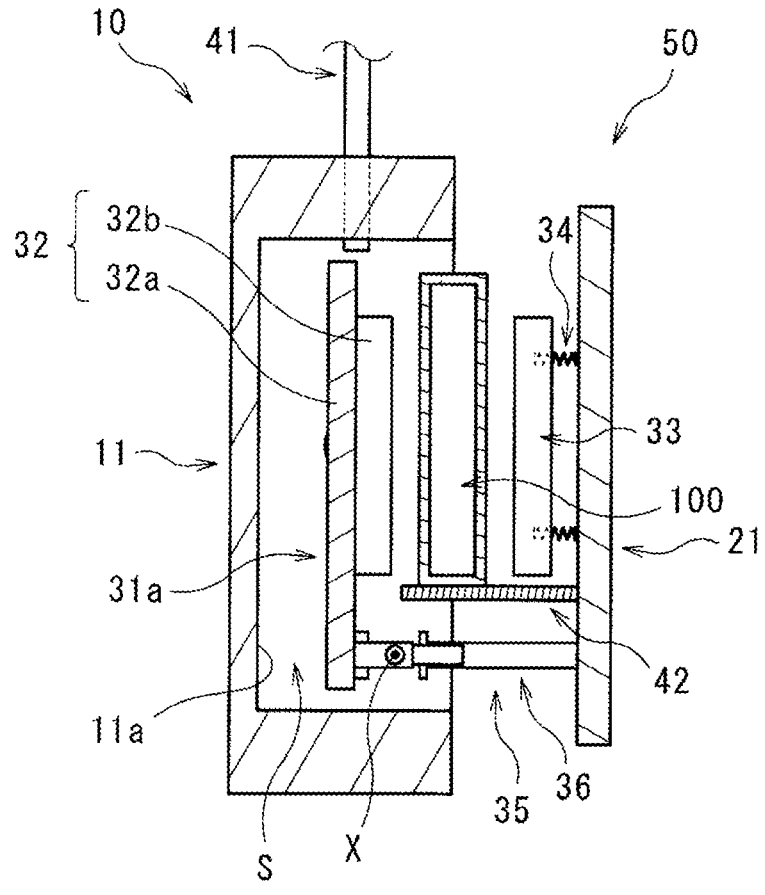
FIG. 11 is a sectional view corresponding to FIG. 8, showing a modified example of a spacer plate of the chamber of FIG. 1.

By pushing the spacer plate 32 via the workpiece 100, the pushing body 33 appresses the spacer plate 32 to the bottom surface of the recess 11a. In other words, according to the chamber 10, the workpiece 100 opposes the bottom surface of the recess 11a via an interval corresponding to the plate thickness of the spacer plate 32. In the chamber 10, therefore, the interval between the bottom surface of the recess 11a and the workpiece 100 can be controlled on the basis of the plate thickness of the spacer plate 32. Hence, as shown in FIG. 11, for example, by adjusting the plate thickness of the spacer plate 32 in accordance with the placement of the opening 100a in the workpiece 100, workpieces 100 of different shapes and different sizes can be housed in the chamber 10 easily and with stability. Note that there are no particular limitations on the method for adjusting the plate thickness of the spacer plate 32, and for example, the plate thickness may be adjusted by varying the thickness of one or both of the body 32a and the auxiliary portion 32b.

Connecting Portion

The connecting portion 35 holds the spacer plate 32 in a cantilevered manner. The connecting portion 35 holds the spacer plate 32 in a linear manner along the outer edge of the spacer plate 32, and more specifically holds the spacer plate 32 in a linear manner along the lower edge of the spacer plate 32. By using the connecting portion 35 to hold the spacer plate 32 in a cantilevered manner, as described above, the workpiece 100 can easily be disposed between the spacer plate 32 and the pushing body 33. Moreover, according to this configuration, the spacer plate 32 can easily be appressed to the bottom surface of the recess 11a.

The connecting portion 35 is preferably provided on the outside of the path taken by the workpiece 100 when the workpiece 100 is disposed between the spacer plate 32 and the pushing body 33. The chamber 10 includes a placement stand 42 that supports the workpiece 100 from below when the workpiece 100 is disposed between the spacer plate 32 and the pushing body 33. The placement stand 42 is connected to the second member 21, for example. The connecting portion 35 connects the spacer plate 32 and the second member 21 in a position (in this embodiment, on the lower side of the placement stand 42) that does not impede placement of the workpiece 100 on the placement stand 42. According to this configuration, the workpiece 100 can be disposed and extracted quickly, easily, and reliably.

Figure 6:
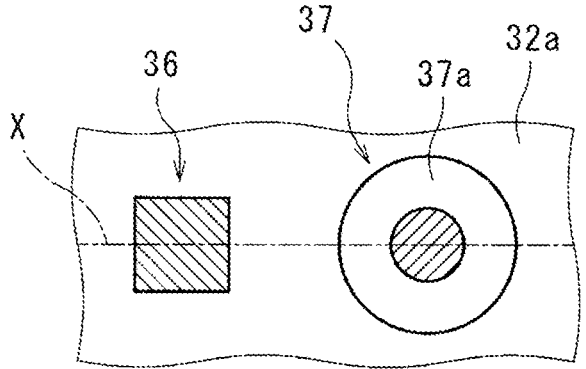
FIG. 6 is a sectional view of the second member and the positioning mechanism of FIG. 3, taken along a VI-VI line.

As shown in FIGS. 4 to 6, the connecting portion 35 includes a swinging mechanism 36 capable of swinging the spacer plate 32, and a fixing mechanism 37 capable of maintaining the interval between the spacer plate 32 and the workpiece 100. More specifically, the connecting portion 35 includes a pair of swinging mechanisms 36 that are arranged with an interval therebetween so as to be connected on the respective sides of the spacer plate 32, and fixing mechanisms 37 that respectively form pairs with the swinging mechanisms 36 are disposed on the respective sides of the spacer plate 32. In the chamber 10, by providing the connecting portion 35 with the swinging mechanisms 36 and the fixing mechanisms 37, the spacer plate 32 can be controlled to be in a swingable state and a state of being fixed in a predetermined position. As a result, by fixing the spacer plate 32 when the workpiece 100 is to be disposed between the spacer plate 32 and the pushing body 33, for example, unintentional contact between the spacer plate 32 and the workpiece 100 can be suppressed. Furthermore, by making the spacer plate 32 capable of swinging in a state where the workpiece 100 is housed in the chamber 10, the spacer plate 32 can easily be appressed to the bottom surface of the recess 11*a*.

The swinging mechanism 36 is rod-shaped, for example. The swinging mechanism 36 is connected to the spacer plate 32 and the second member 21 at respective longitudinal direction ends thereof. The swinging mechanism 36 has a rotary shaft X that serves as the swinging center of the spacer plate 32. The rotary shafts X provided on the pair of swinging mechanisms 36 are positioned coaxially.

Further, the swinging mechanism 36 includes an expandable portion 36*a* capable of varying the interval between the spacer plate 32 and the second member 21. The expandable portion 36*a* has a spring member such as a compression spring. The expandable portion 36*a* is normally held in an expanded state. The expandable portion 36*a* is configured to be capable of contracting so that when the second member 21 is pushed toward the spacer plate 32 side in a state where the spacer plate 32 is supported by the bottom surface of the recess 11*a*, the pushing body 33 can be pushed against the workpiece 100.

The fixing mechanism 37 is configured to be capable of fixing the spacer plate 32 parallel to the second member 21. The fixing mechanism 37 is rod-shaped, for example, and has a pushing portion 37*a* for stopping the swinging of the spacer plate 32 on a tip end portion (an end portion on the side close the spacer plate 32) thereof. The fixing mechanism 37 also includes an elastic body 37*b* for pushing the spacer plate 32 in a direction heading away from the second member 21. The fixing mechanism 37 may also include a drive source such as an air cylinder for controlling the interval between the pushing portion 37*a* and the spacer plate 32, the pushing force applied to the spacer plate 32, and so on. The fixing mechanism 37 is configured to be capable of moving or expanding/contracting between a fixing position for fixing the spacer plate 32 and a swingable position in which the spacer plate 32 can swing.

As shown in FIG. 6, the pushing portion 37*a* is configured to be capable of stopping the swinging of the spacer plate 32 by pushing parts thereof positioned on opposite sides of the rotary shaft X (a part positioned on the upper side of the rotary shaft X and a part positioned on the lower side of the rotary shaft X) with the same force. In FIG. 6, the pushing portion 37*a* is plate-shaped. Note, however, that there are no particular limitations on the specific shape of the pushing portion 37*a*. Moreover, the pushing portion 37*a* does not have to be constituted by a single member and may be provided so that the parts positioned on opposite sides of the rotary shaft X are pushed by two or more members, for example.

The elastic body 37*b* is a spring member such as a compression spring, for example. By including the elastic body 37*b*, the fixing mechanism 37 can hold the spacer plate 32 swingably using the elastic force of the elastic body 37*b* while keeping the pushing portion 37*a* in contact with the spacer plate 32. As a result, unintentional tilting of the spacer plate 32 can be suppressed while easily and reliably appressing the spacer plate 32 to the bottom surface of the recess

11*a*. Note that since the fixing mechanism 37 includes the elastic body 37*b*, the spacer plate 32 can easily be fixed by pushing the pushing portion 37*a* further in.

Lid

The second member 21 and the first positioning mechanism 31*a* are configured as a lid 50 for forming a hermetically sealed space inside the chamber 10. The lid 50 is a lid for a leak tester that houses the workpiece 100 having the opening 100*a*. The lid 50 itself is one embodiment of the present invention. The lid 50 includes a lid body (the second member 21) capable of closing the entrance/exit through which the workpiece 100 is inserted into/removed from the chamber 10, the spacer plate 32, which is disposed on an inner surface side of the lid body such that an interval is formed between the spacer plate 32 and the lid body, and the pushing body 33, which is disposed on the inner surface of the lid body such that the workpiece 100 can be sandwiched between the pushing body 33 and the spacer plate 32.

The lid 50 is capable of positioning workpieces 100 of different sizes within the housing space S.

Positioning Procedures Employed by First Positioning Mechanism

Figure 7:
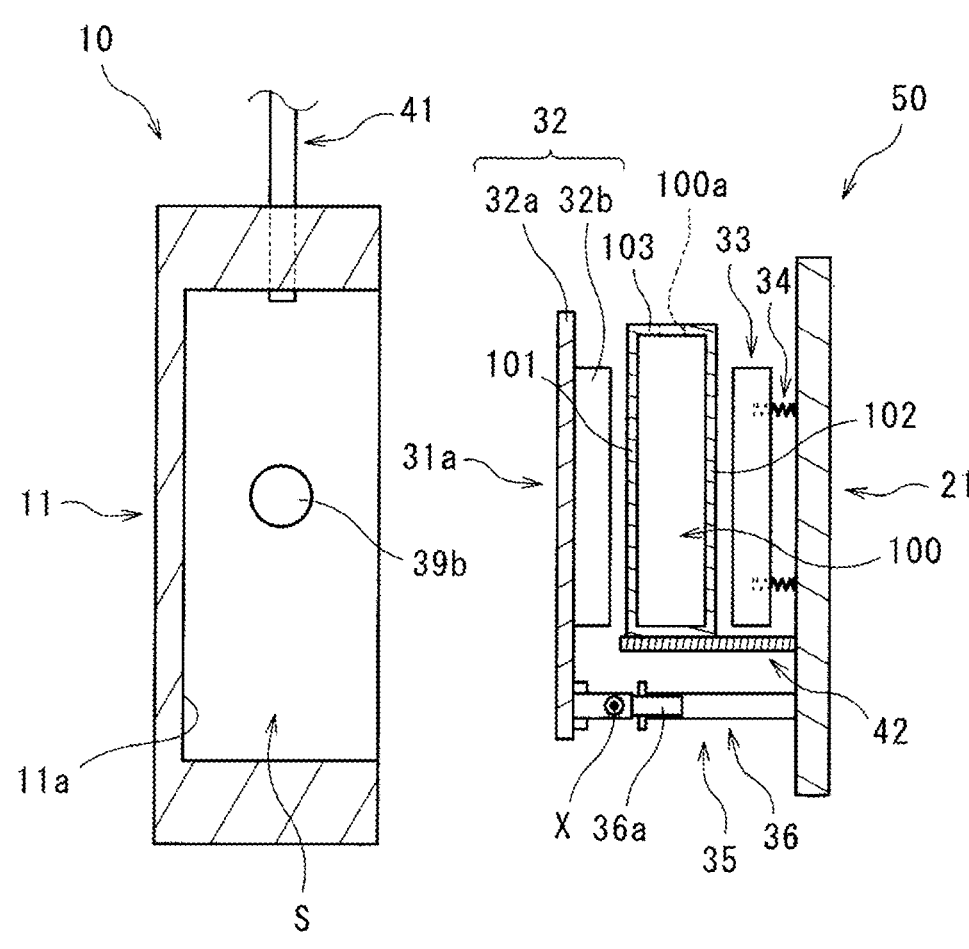
FIG. 7 is a schematic sectional view showing a procedure for appressing the second member of the chamber of FIG. 1 to a first member.

Next, referring to FIGS. 7 to 9, procedures for positioning the workpiece 100 using the first positioning mechanism 31*a* will be described.

As described above, the first positioning mechanism 31*a* positions the workpiece 100 in the depth direction of the recess 11*a*. When the workpiece 100 is to be positioned by the first positioning mechanism 31*a*, first, as shown in FIG. 7, the workpiece 100 is disposed in the space between the spacer plate 32 and the pushing body 33. More specifically, in a state where the interval between the spacer plate 32 and the pushing body 33 is larger than the interval between the first surface 101 and the second surface 102 of the workpiece 100, the workpiece 100 is placed on the placement stand 42 so as not to contact the spacer plate 32 and the pushing body 33. At this time, the spacer plate 32 is fixed parallel to the second member 21 by the fixing mechanism 37. As a result, contact between the spacer plate 32 and the workpiece 100 caused by swinging of the spacer plate 32 is suppressed.

Figure 8:
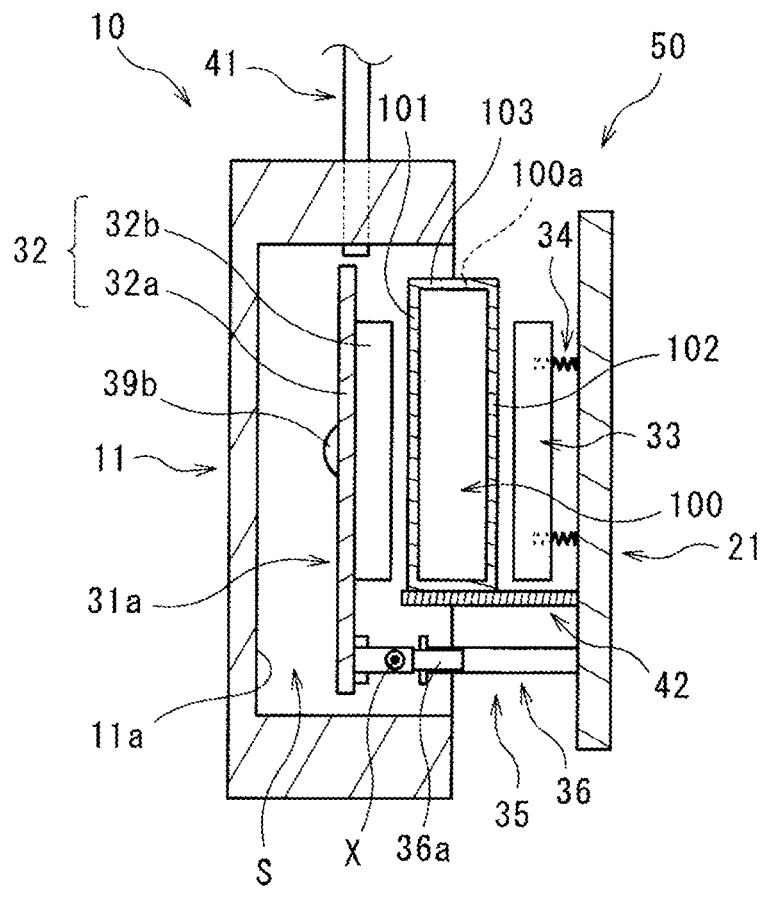
FIG. 8 is a schematic sectional view showing a procedure following that of FIG. 7 for appressing the second member of the chamber of FIG. 1 to the first member.

Next, as shown in FIG. 8, the second member 21 is moved so as to close the open end of the recess 11*a*. At this time, the fixing mechanism 37 moves or contracts from the fixing position to the swinging position, as described above. The fixing mechanism 37 preferably moves or contracts from the fixing position to the swinging position immediately before the spacer plate 32 comes into contact with the bottom surface of the recess 11*a* so that the workpiece 100 can be held with stability while the second member 21 moves. Note that the chamber 10 can also hold the spacer plate 32 swingably while keeping the pushing portion 37*a* in contact with the spacer plate 32 by using the elastic force of the elastic body 37*b*, as described above. According to this configuration, unintentional tilting and so on of the spacer plate 32 can easily be suppressed.

Figure 9:
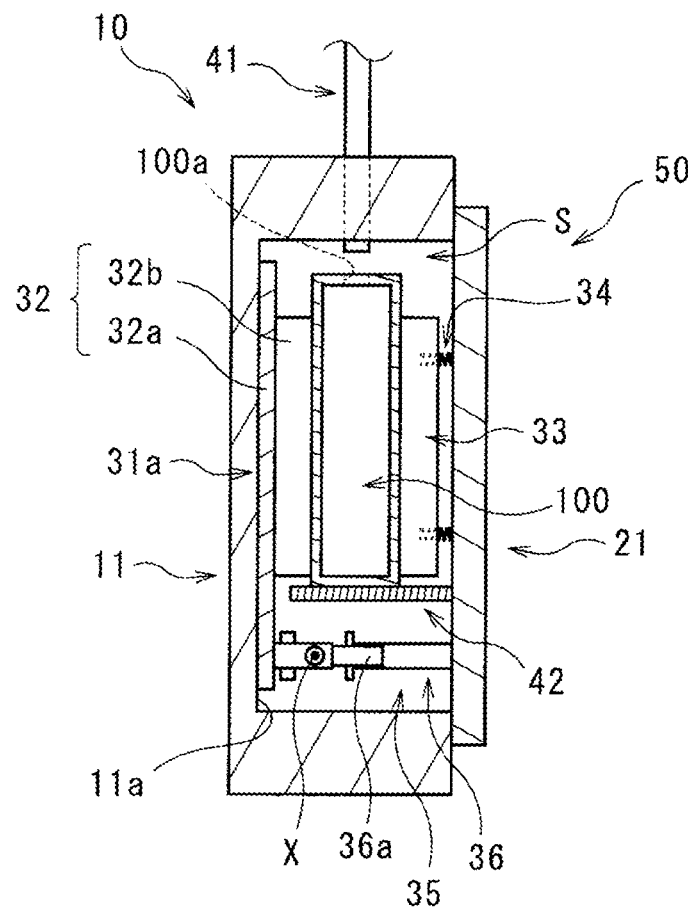
FIG. 9 is a schematic sectional view showing a state in which the second member of the chamber of FIG. 1 has been appressed to the first member.

Next, as shown in FIG. 9, the open end of the recess 11*a* is closed by the second member 21. In the chamber 10, the swinging mechanism 36 is capable of expanding and contracting, and the fixing mechanism 37 is capable of moving or expanding and contracting (in other words, the connecting portion 35 is provided so as to be capable of expanding and contracting), and therefore, when the open end of the recess 11*a* is closed by the second member 21, the interval between the spacer plate 32 and the pushing body 33 is automatically adjusted in accordance with the depth of the recess 11*a*. More specifically, the interval between the spacer plate 32 and the pushing body 33 is automatically adjusted so that the first surface 101 of the workpiece 100 contacts the spacer plate 32 and the second surface 102 of the workpiece 100 contacts the pushing body 33. As a result, due to the action of the spring member 34, the workpiece 100 is maintained in a state of being pushed toward the spacer plate 32 side by the pushing body 33.

Furthermore, at this time, the spacer plate 32 is pushed by the pushing body 33 toward the bottom surface side of the recess 11a via the workpiece 100. The spacer plate 32 is held so as to be capable of swinging in alignment with the bottom surface of the recess 11a, and is therefore appressed to the bottom surface of the recess 11a. As a result, the arrangement of the spacer plate 32 within the housing space S can be stabilized, and the workpiece 100 can be positioned within the housing space S more reliably.

Hence, before the second member 21 closes the open end of the recess 11a, the connecting portion 35 holds the spacer plate 32 and the pushing body 33 such that the spacer plate 32 and the pushing body 33 do not to contact the workpiece 100, and once the second member 21 has closed the open end of the recess 11a, the connecting portion 35 holds the spacer plate 32 and the pushing body 33 in contact with the workpiece 100. As a result, the workpiece 100 can be housed in the housing space S and positioned within the housing space S easily and reliably.

Second Positioning Mechanism

As shown in FIG. 2, the second positioning mechanism 31b includes a first moving body 38 that projects into the housing space S and supports the workpiece 100 in a predetermined position in the projection direction of the first moving body, and a second moving body 39 that projects into the housing space S such that the second moving body 39 faces the first moving body 38, and pushes the workpiece 100 toward the first moving body 38 side. By providing the chamber 10 with the second positioning mechanism 31b, the workpiece 100 can be positioned within the housing space S easily and reliably.

Figure 10:
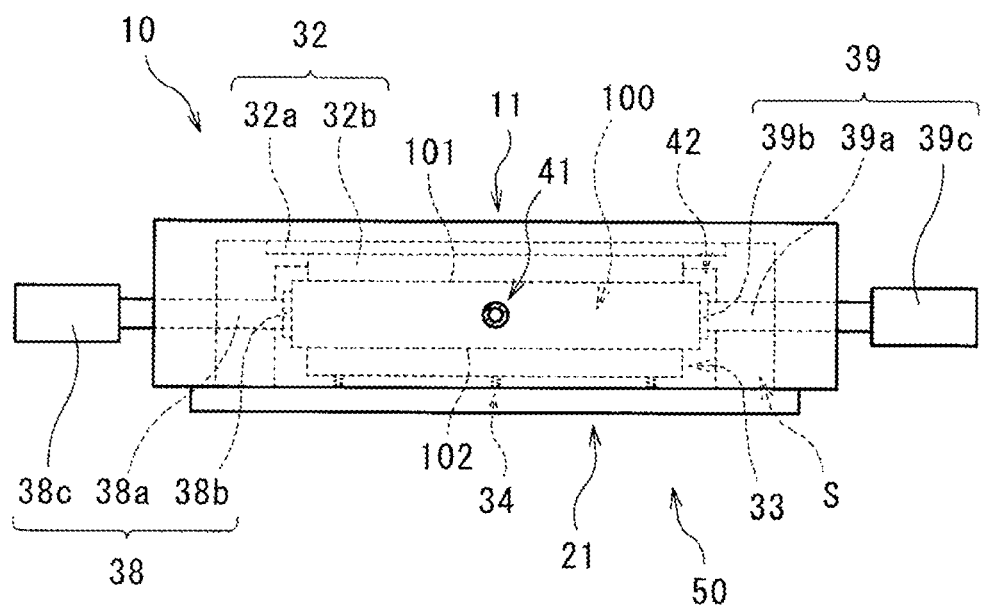
FIG. 10 is a schematic plan view showing a state following positioning of a workpiece in the chamber of FIG. 1.

As shown in FIG. 10, the second positioning mechanism 31b preferably positions the workpiece 100 from a direction perpendicular to the positioning direction of the first positioning mechanism 31a (i.e., the depth direction of the recess 11a). Furthermore, the second positioning mechanism 31b preferably positions the workpiece 100 from a direction that is orthogonal to the projection direction of the nozzle 41. In other words, the second positioning mechanism 31b preferably positions the workpiece 100 from a direction perpendicular to the depth direction of the recess 11a so that together with the first positioning mechanism 31a, the second positioning mechanism 31b can position the workpiece 100 placed on the placement stand 42 from four orthogonal directions in a planar view. According to this configuration, the workpiece 100 is positioned by the first positioning mechanism 31a and the second positioning mechanism 31b so that the positions of the opening 100a of the workpiece 100 and the nozzle 41 are aligned in a planar view, or in other words so that the opening 100a is in a predetermined position. Furthermore, by attaching the nozzle 41 to the opening 100a of the positioned workpiece 100, the workpiece 100 can be supported from three mutually orthogonal axial directions. As a result, the arrangement of the workpiece 100 within the housing space S can be maintained easily and with stability.

The first moving body 38 and the second moving body 39 respectively penetrate the first member 11. According to this configuration, the workpiece 100 that is positioned in the depth direction of the recess 11a when the second member 21 closes the open end of the recess 11a can easily be positioned from a direction perpendicular to the depth direction.

The first moving body 38 includes a rod (a first rod 38a) that projects into the housing space S. A support portion (a first support portion 38b) is disposed on a tip end portion of the first rod 38a. The first support portion 38b is plate-shaped, for example.

The first moving body 38 includes a control portion (a first control portion 38c) for controlling the projection length of the first rod 38a. The first control portion 38c is disposed on the outside of the housing space S. The first control portion 38c is a numerical value control actuator, for example. In other words, the first moving body 38 includes the first rod 38a that is caused to extend and retract by the numerical value control actuator. According to this configuration, the projection length of the first rod 38a can be controlled easily and reliably by the first control portion 38c so that the positions of the opening 100a of the workpiece 100 and the nozzle 41 are aligned in a planar view. As a result, the workpiece 100 can be positioned within the housing space S even more easily and reliably.

The second moving body 39 includes a rod (a second rod 39a) that projects into the housing space S. A support portion (a second support portion 39b) is disposed on a tip end portion of the second rod 39a. The second support portion 39b is plate-shaped, for example.

The second moving body 39 includes a control portion (a second control portion 39c) for controlling the projection length of the second rod 39a so that the workpiece 100 can be supported by the second support portion 39b. The second control portion 39c is disposed on the outside of the housing space S. A numerical value control actuator, a pressure cylinder, or the like may be used as the second control portion 39c. According to this configuration, in a state where the projection length of the first rod 38a has been controlled by the first control portion 38c, the projection length of the second rod 39a can easily be controlled so that the workpiece 100 can be sandwiched between the first support portion 38b and the second support portion 39b. As a result, the workpiece 100 can be positioned within the housing space S even more easily and reliably.

Second Embodiment

Leak Tester

Figure 12:
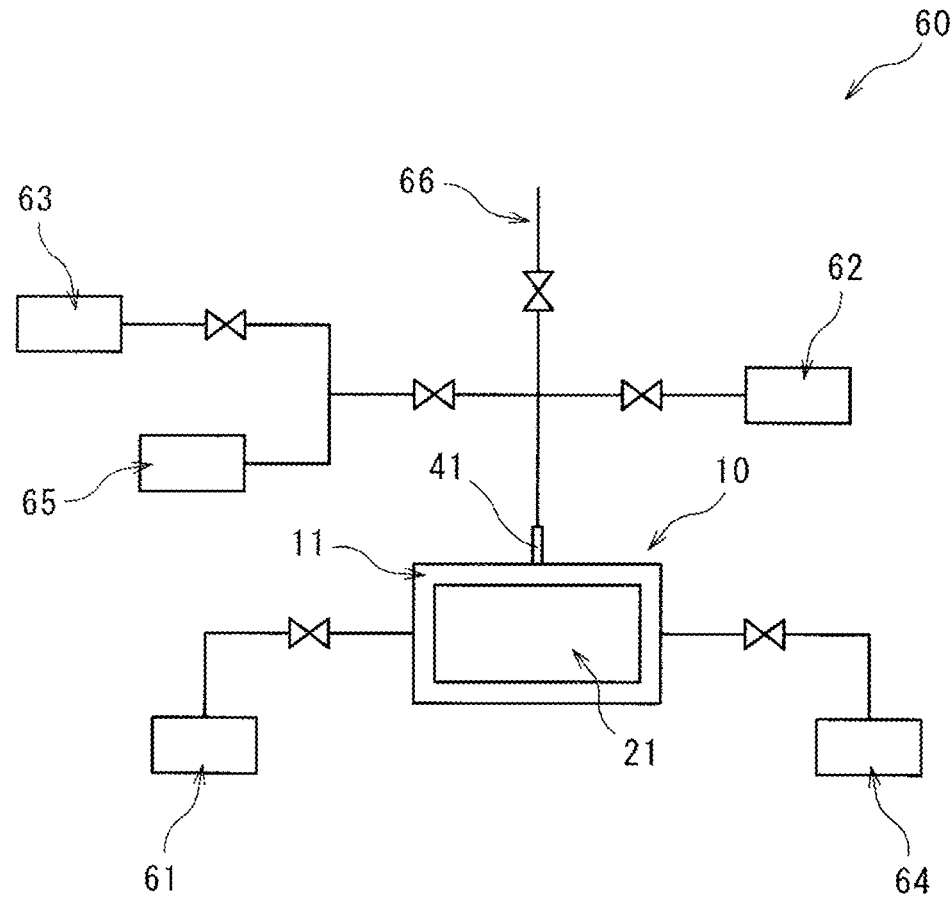
FIG. 12 is a schematic view showing a leak tester including the chamber of FIG. 1.

A leak tester 60 shown in FIG. 12 includes the chamber 10. There are no particular limitations on the specific configurations of the leak tester 60 other than the chamber 10. For example, the leak tester 60 can be configured to include: the chamber 10; a first vacuum pump 61 for decompressing the housing space formed in the chamber 10; a second vacuum pump 62 for decompressing the internal space of the workpiece housed in the housing space through the nozzle 41; a tracer gas supply portion 63 which, following vacuum pumping by the second vacuum pump 62, seals a tracer gas in the internal space of the workpiece through the nozzle 41; a leak detector 64 for detecting tracer gas that has leaked out from the workpiece; a tracer gas collection portion 65 for collecting the tracer gas through the nozzle 41 after performing a leak test on the workpiece; and an atmosphere opening portion 66 for returning the interior of the workpiece to the atmosphere through the nozzle 41 after performing the leak test on the workpiece. There are no particular limitations on the tracer gas, but examples thereof include hydrogen, helium, a mixed gas containing these gases, and so on.

Since the leak tester 60 includes the chamber 10, workpieces of different sizes can be positioned within the housing space. With the leak tester 60, therefore, leak tests can easily be performed on workpieces of different sizes.

OTHER EMBODIMENTS

The configuration of the present invention is not limited to the embodiments described above. Accordingly, in the embodiments described above, constituent elements of the respective parts of the embodiments may be omitted, replaced, or added to on the basis of the disclosure in the present specification and common technical knowledge, and all such modifications are to be interpreted as belonging to the scope of the present invention.

The specific shapes of the first member and the second member are not limited to the shapes described in the embodiments. For example, a recess may be provided in the second member of the chamber in addition to the first member. In this case, the entirety of a region defined by the recess provided in the first member and the recess provided in the second member may be formed as the housing space described above.

The second member may be configured so as to be inserted up to a midway point in the depth direction of the recess provided in the first member. In this case, for example, by inserting the second member into the recess, the pushing body can be configured to push the spacer plate via the workpiece.

Figure 13:
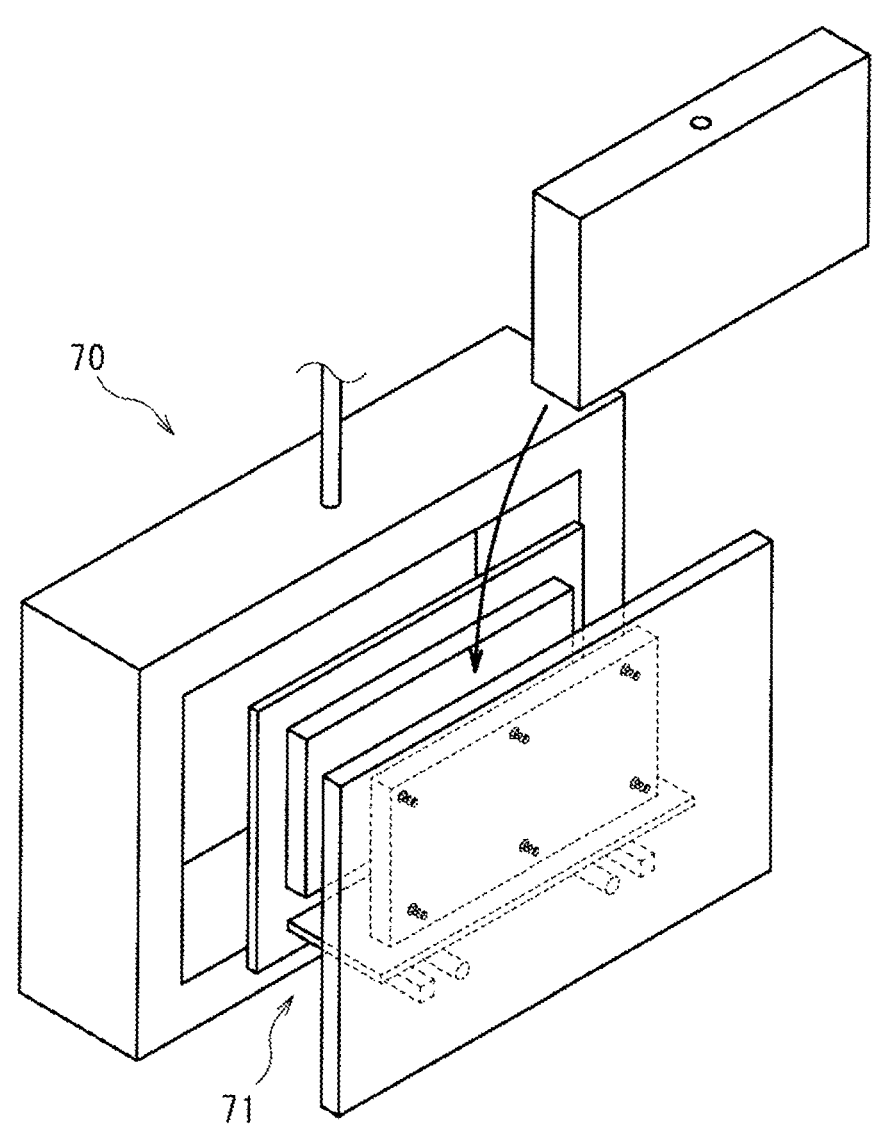
FIG. 13 is a schematic perspective view showing a chamber according to a different embodiment to that of the chamber of FIG. 1.

In the above embodiments, a configuration in which the positioning mechanism includes the first positioning mechanism and the second positioning mechanism was described. As shown in FIG. 13, however, a chamber 70 may be configured to include only a first positioning mechanism 71. The chamber may also be configured to include only the second positioning mechanism or configured to include another positioning mechanism either in place of one of the first and second positioning mechanisms or in addition to the first and second positioning mechanisms.

Figure 14:
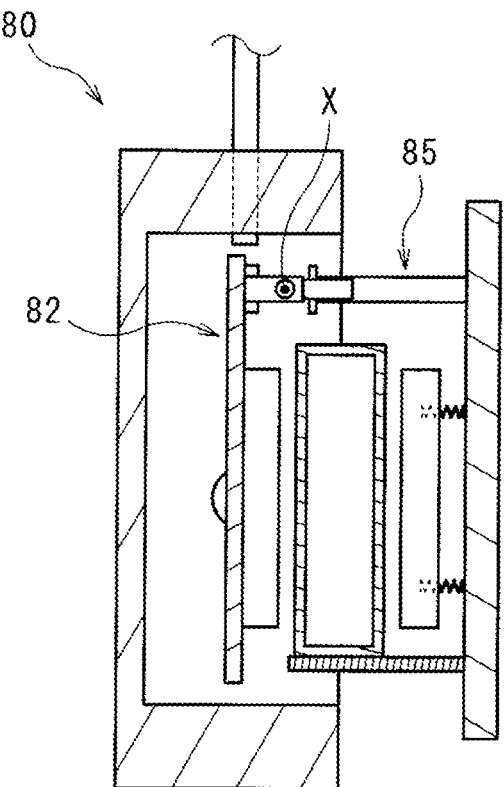
FIG. 14 is a schematic sectional view showing a chamber according to a different embodiment to those of the chambers of FIGS. 1 and 13.

In the above embodiments, a configuration in which the connecting portion holds the spacer plate in a linear manner along the lower edge of the spacer plate was described. However, the connecting portion may be disposed along an outer edge, other than the lower edge, of the spacer plate. For example, in a chamber 80 shown in FIG. 14, a connecting portion 85 is disposed along the upper edge of a spacer plate 82. Likewise with this configuration, in the chamber 80, workpieces of different sizes can be positioned within a housing space in the chamber 80.

The specific configurations of the spacer plate and the pushing body are not limited to the configurations described in the embodiments. For example, the spacer plate does not have to include the auxiliary portion described above. Moreover, the pushing body may take a shape other than a plate shape. Furthermore, when unevenness or the like is formed on the outer surface of the workpiece, the surfaces of the spacer plate and the pushing body that contact the workpiece may include unevenness or the like corresponding to that of the outer surface of the workpiece.

The arrangement of the spacer plate within the housing space may be set on the basis of the overall specifications of the chamber, such as the shape of the recess. The spacer plate may be provided so as to be interposed between the workpiece and an inner surface, other than the bottom surface, of the recess.

The spacer plate can also be configured so as not to be held in a cantilevered manner by the connecting portion. For example, a configuration in which the spacer plate and the second member are connected by the four corners of the spacer plate may be employed. Furthermore, in this case, the parts where the spacer plate and the second member are connected may be formed to be capable of expanding and contracting. Note, however, that from the viewpoint of simplifying the overall device, facilitating insertion/removal of the workpiece into/from the housing space, and so on, the spacer plate is preferably held by the connecting portion in a cantilevered manner.

The connecting portion may be provided to be capable of tilting the spacer plate in a plurality of directions. Further, the specific configurations of the swinging mechanism and the fixing mechanism are not limited to the configurations described in the embodiments. For example, the fixing mechanism may be provided so as to be moved or caused to expand and contract only by a drive source such as an air cylinder or provided so as to be caused to expand and contract only by the elastic body described above.

The projection directions of the first moving body and second moving body of the second positioning mechanism can be set in accordance with the specific configuration of the chamber. For example, when the chamber does not include the first positioning mechanism, the second positioning mechanism may be provided so as to position the workpiece in the depth direction of the recess provided in the first member.

As noted above, in the first moving body, the projection length of the rod is preferably controlled by a numerical value control actuator. However, the mechanism for controlling the projection length of the rod may be altered in accordance with the specifications of the workpiece and so on.

The leak tester may be configured as a device that uses a fluid other than a gas.

As described above, the chamber according to an aspect of the present invention is suitable for positioning a workpiece within a housing space.

What is claimed is:

1. A chamber for a leak tester, the chamber housing in an interior thereof a workpiece having an opening, the chamber comprising:

a first member having a recess that forms a housing space for the workpiece;

a second member adapted to close an open end of the recess; and a positioning mechanism for positioning the workpiece within the housing space such that the opening is in a predetermined position, wherein the positioning mechanism includes a spacer plate and a pushing body, wherein the pushing body is disposed so as to face the spacer plate with the workpiece therebetween, wherein the pushing body is adapted to push the workpiece toward the spacer plate, and wherein the positioning mechanism holds the workpiece apart from the first member and the second member.

2. The chamber according to claim 1, wherein the spacer plate and the pushing body are disposed on the second member, and wherein the spacer plate is interposed between the workpiece and an inner surface of the recess.

3. The chamber according to claim 1, wherein the pushing body pushes the spacer plate via the workpiece such that the spacer plate is appressed to an inner surface of the recess.

4. The chamber according to claim 1,
wherein the positioning mechanism includes a connecting portion for connecting the spacer plate and the second member, and
wherein the spacer plate is held by the connecting portion in a cantilevered manner.

5. The chamber according to claim 4, wherein the connecting portion includes a swinging mechanism adapted to swing the spacer plate, and a fixing mechanism adapted to maintain an interval between the spacer plate and the workpiece.

6. The chamber according to claim 5, wherein the fixing mechanism includes an elastic body for pushing the spacer plate in a direction heading away from the second member.

7. The chamber according to claim 4, wherein the connecting portion holds the spacer plate and the pushing body such that the spacer plate and the pushing body do not contact the workpiece before the second member closes the open end of the recess, and holds the spacer plate and the pushing body in contact with the workpiece once the second member has closed the open end of the recess.

8. The chamber according to claim 1, wherein the second member is adapted to close the open end of the recess in a state where the workpiece is disposed between the spacer plate and the pushing body.

9. The chamber according to claim 1, further comprising a nozzle,
wherein the positioning mechanism positions the workpiece in a position where the nozzle is attachable to the opening.

10. A chamber for a leak tester, the chamber housing in an interior thereof a workpiece having an opening, the chamber comprising:
a first member having a recess that forms a housing space for the workpiece;
a second member adapted to close an open end of the recess; and
a positioning mechanism for positioning the workpiece within the housing space such that the opening is in a predetermined position,
wherein the positioning mechanism includes:
a first moving body that projects into the housing space and supports the workpiece in a predetermined position in a projection direction of the first moving body; and
a second moving body that projects into the housing space such that the second moving body faces the first moving body, and pushes the workpiece toward the first moving body, and
wherein the positioning mechanism holds the workpiece apart from the first member and the second member.

11. The chamber according to claim 10, wherein the first moving body and the second moving body penetrate the first member.

12. The chamber according to claim 10, wherein the first moving body includes a rod that is caused to extend and retract by a numerical value control actuator.

13. A lid for use on a chamber for a leak tester, the chamber housing a workpiece having an opening, the lid comprising:
a lid body that is adapted to close an entrance or exit through which the workpiece is inserted into or removed from the chamber;
a spacer plate disposed on an inner surface side of the lid body such that an interval is formed between the spacer plate and the lid body; and
a pushing body disposed on the inner surface of the lid body such that the workpiece is sandwiched between the pushing body and the spacer plate,
wherein the pushing body is disposed so as to face the spacer plate with the workpiece therebetween, and
wherein the pushing body is adapted to push the workpiece toward the spacer plate.

14. A leak tester comprising a chamber, the chamber housing in an interior thereof a workpiece having an opening, the chamber comprising:
a first member having a recess that forms a housing space for the workpiece;
a second member adapted to close an open end of the recess; and
a positioning mechanism for positioning the workpiece within the housing space such that the opening is in a predetermined position,
wherein the positioning mechanism includes a spacer plate and a pushing body,
wherein the pushing body is disposed so as to face the spacer plate with the workpiece therebetween,
wherein the pushing body is adapted to push the workpiece toward the spacer plate, and
wherein the positioning mechanism holds the workpiece apart from the first member and the second member.

* * * * *